Oct. 18, 1966 W. F. JOHNSON 3,279,035
INDEXABLE CUTTER BLADE
Filed Dec. 18, 1964 3 Sheets-Sheet 1
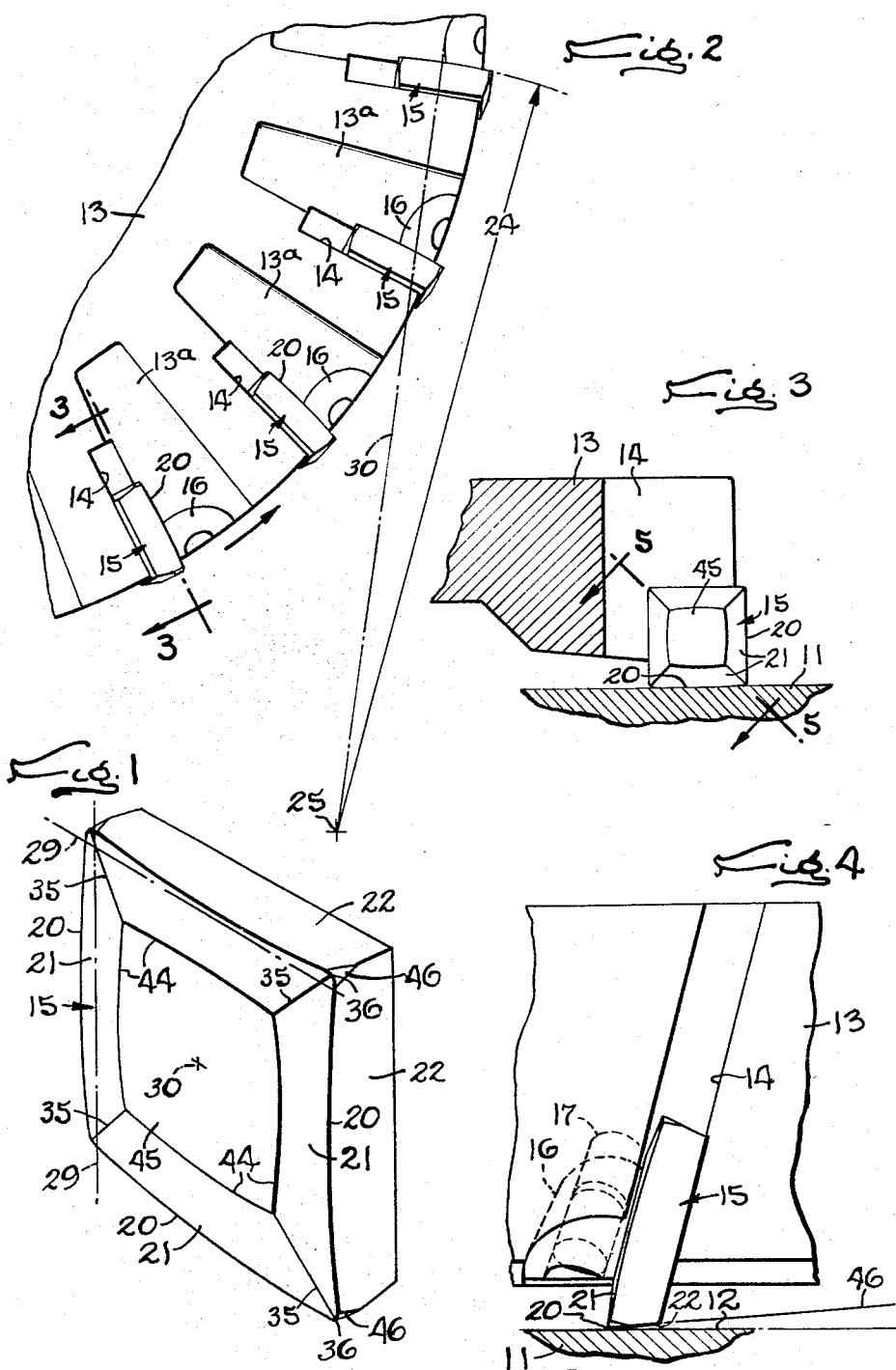

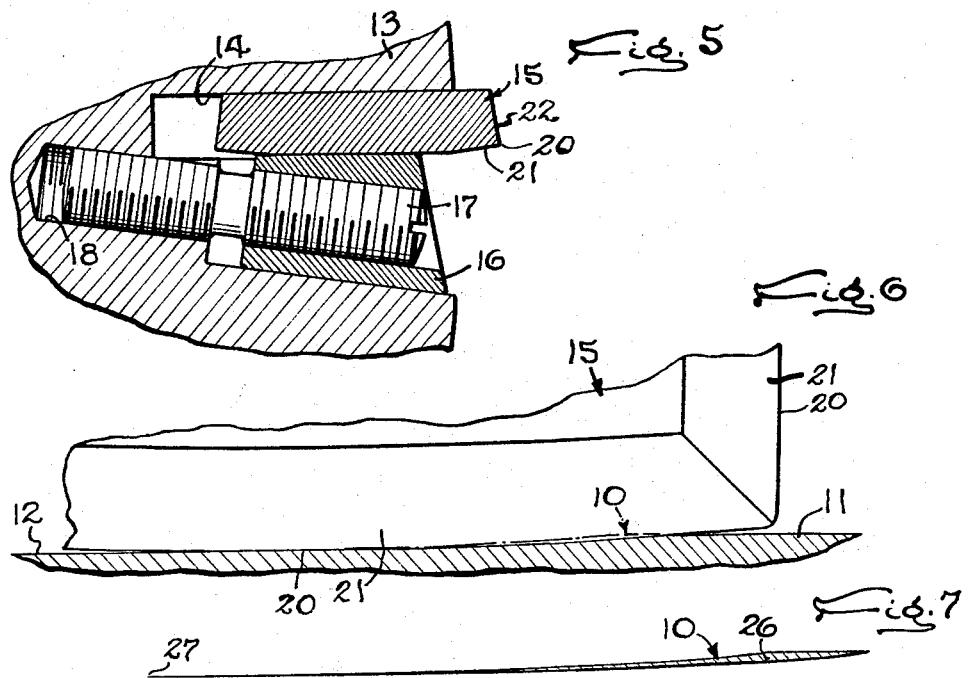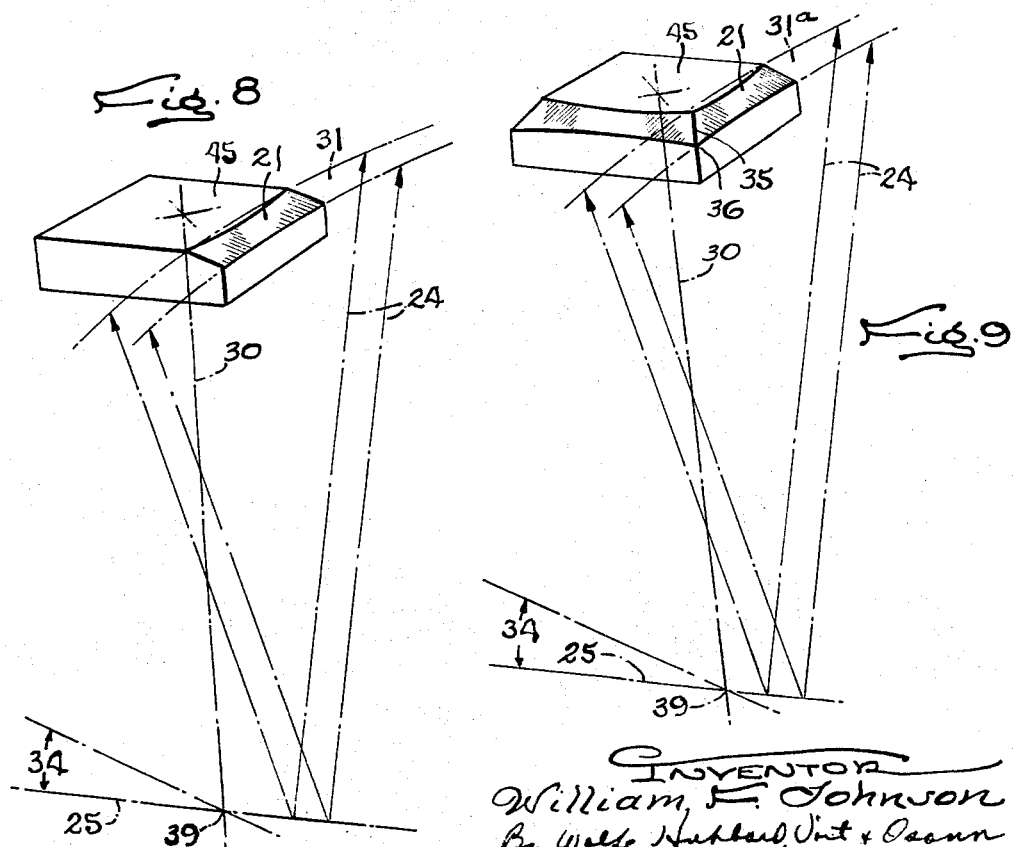

Oct. 18, 1966 W. F. JOHNSON 3,279,035
INDEXABLE CUTTER BLADE
Filed Dec. 18, 1964 3 Sheets-Sheet 3
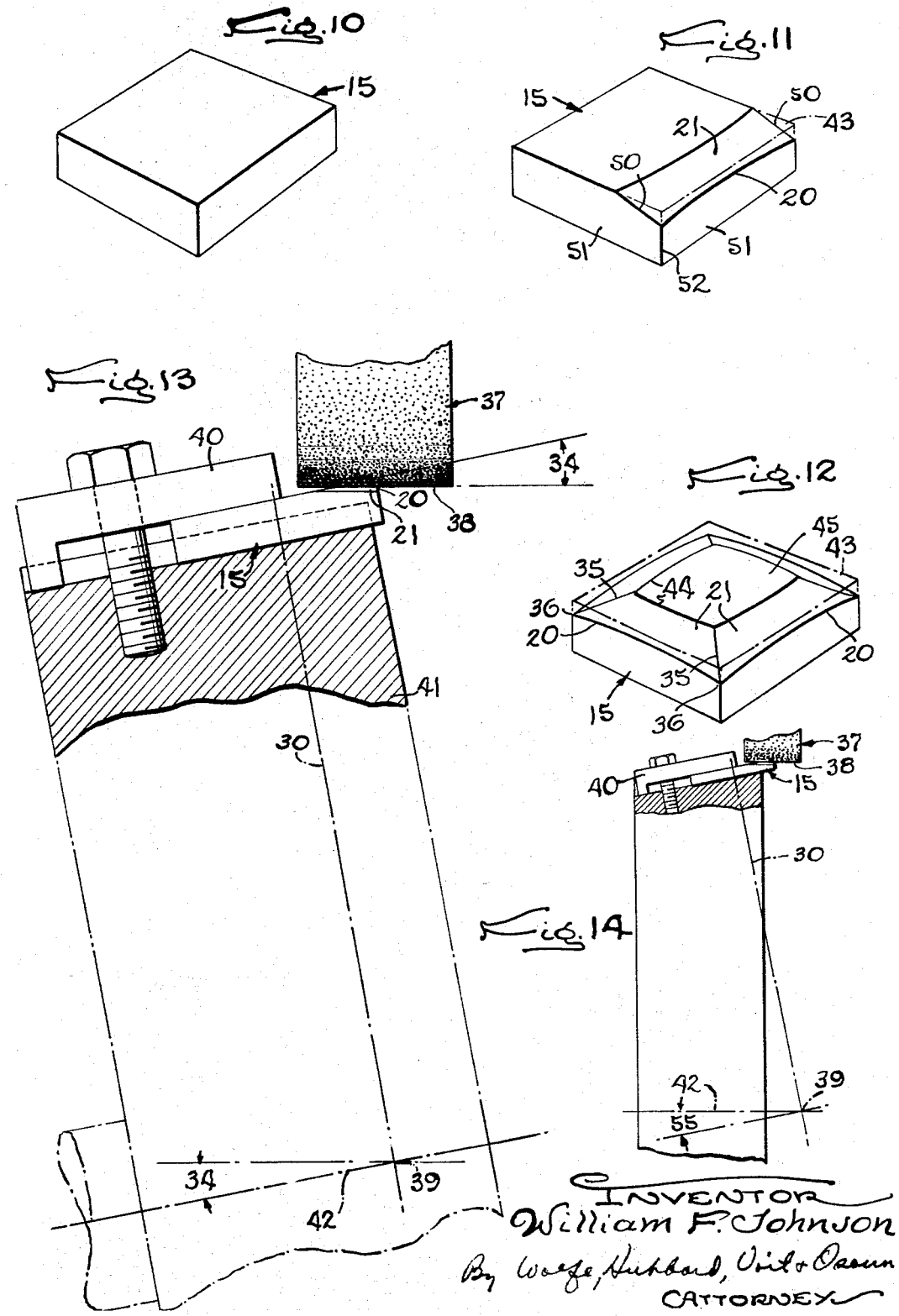

United States Patent Office 3,279,035
Patented Oct. 18, 1966

3,279,035
INDEXABLE CUTTER BLADE
William F. Johnson, Rockford, Ill., assignor to The Ingersoll Milling Machine Company, Rockford, Ill., a corporation of Illinois
Filed Dec. 18, 1964, Ser. No. 419,332
6 Claims. (Cl. 29—95)

This invention relates to a blade for mounting in the body of an inserted blade cutter for use in finish milling, boring and turning and comprising a relatively flat wafer in the form of a polygon having cutting edges along the sides of the polygon with the cutting faces for the respective cutting edges formed on one face of the wafer, the projection of the cutting edges on the plane of the wafer being the same portions of the long sides of identical shallow ellipses.

The primary object is to provide an indexable blade of the above character in which the several cutting edges are of substantially equal lengths and each comprises part of an extremely shallow ellipse by virtue of the cutting edge being defined by the intersection of flat planar clearance faces along the edges of the polygonal wafer and adjacent cutting faces of equal size and shape and convexly contoured in a novel manner.

A more detailed object is to impart the desired and same convex contour to each of the several cutting faces by forming the latter as areas of identical cylinders, cones, or ellipsoids.

Other objects and advantages of the invention will become apparent from the following detailed description taken in connection with the accompanying drawings, in which FIGURE 1 is a perspective view of the indexable blade constituting the present invention.

FIG. 2 is a fragmentary end view of a face milling cutter incorporating the improved indexable blade.

FIG. 3 is a fragmentary section taken along the line 3—3 of FIG. 2.

FIG. 4 is a side view of a portion of FIG. 2.

FIG. 5 is a fragmentary section taken along the line 5—5 of FIG. 3.

FIG. 6 is an enlarged fragmentary view of a blade face and work section illustrating the cutting action.

FIG. 7 is an enlarged cross-section of the chip removed by the blade during face milling.

FIGS. 8 and 9 are fragmentary perspective views illustrating the manner of forming the cutting faces of two adjacent edges of the improved blade.

FIGS. 10, 11 and 12 are perspective views illustrating the manner of converting a wafer of cutting material into the improved blade.

FIG. 13 is an elevational view illustrating the manner of grinding the cutting face of the first blade edge.

FIG. 14 is a view similar to FIG. 13 illustrating an alternative method of contouring the cutting faces of the several cutting edges.

For purposes of illustration, the improved indexable blade is shown in the drawings incorporated in a face milling cutter adapted by combined rotation and transaxial feed to remove a thin layer 10 of material from a workpiece 11 and form an extremely flat and smooth finished surface 12 thereon. The cutter comprises a generally cylindrical body 13 formed around its periphery with radially and axially opening slots 14 in which indexable blades 15 of the improved construction are clamped by wedges 16 actuated by screws 17 (FIG. 9). One end of each screw threads through the wedge while the other reversely threaded end threads into a hole 13 in the body at the inner end of the slot. The blade edges project beyond the end of the body immediately behind chip recesses 13ᵃ.

Each blade comprises a generally flat wafer forming a polygon having peripheral edges of equal lengths, there being four such side edges in the present instance. Along each edge and at the front or leading face of the blade is a cutting edge 20 defined by the intersection of a convexly curved cutting face 21 on the leading or front face of the wafer and a flat and planar clearance face 22 along one side of the polygon. The radius 24 (FIG. 1) of each point on each curved cutting face 21 is of substantial length, for example 4 to 20 inches and the center 25 of curvature with the blade positioned properly in the cutter body is disposed outside of the body, this axis being parallel to the rotational axis of the cutter.

With the cutting and clearance faces 21 and 22 thus formed, it will be apparent that each cutting edge 20 constitutes part of the longer side (FIG. 6) of an extremely shallow ellipse so that, during the combined rotation and transaxial feed of the cutter body, the active cutting edge moves broadwise through the work and removes a layer or chip 10 (FIGS. 6 and 7) which is of maximum thickness 26 at the outer end of the edge 20 and tapers so gradually to its inner edge 27 that the finished work surface 12 formed by the action of successive blades is reduced to the desired precise flatness. The length of the thickened portion 26 of the chip is determined by the feed per revolution of the cutter and the shallowness of the ellipse of intersection of the faces 21 and 22, the latter being determined by the length of the radius 24 of curvature of the cutting faces 21. As a result of the overlapping of the cuts taken by successive blades, the finished surface 12 is of greater flatness and smoothness than is possible with the stepped and flat finishing edges commonly employed in face milling cutters.

In accordance with the present invention, the clearance faces 22 are spaced equidistant from the center 30 of the wafer 15 and the cutting faces 21 are convexly contoured identically in all planes 29 paralleling these edges and perpendicular to the plane of the wafer so that the cutting edges 20 are of equal lengths and their cutting faces are of the same size, shape, and convex contour and equal radii of curvature but with their axes 25 of curvature angularly spaced around the wafer 15 according to the number of sides on the equilateral polygon formed by the edges 20. Accordingly, the faces 21 are the same areas of similar but angularly spaced surfaces of revolution which may be cylinders, cones or ellipsoids having radii several times as long as the lengths of the cutting edges 20.

In forming the cutting faces 21, the axes of the surfaces of revolution on which the faces lie are inclined relative to the plane of the wafer at an angle 34 which is relatively small, for example ten degrees as shown in FIGS. 8 and 10, but large enough to insure that no one of the faces 21 will extend to and interrupt either of the adjacent cutting edges 20. More particularly, the several faces 21 are so positioned relative to each other, the plane of the wafer 15 and the clearance faces 22 that the adjacent faces intersect each other above the cutting edges and along lines 35 which extend diagonally across the front face of the wafer and intersect each other substantially at the corners of the wafer.

The desired contour of the cutting faces 21 may be obtained by preforming or by a metal removing operation such as surface grinding. When the surface of revolution is a conical frustum and the cutting faces are to be formed by grinding, the step-up shown in FIG. 13 may be employed. A grinding wheel 37 having a cylindrical peripheral face 38 is mounted to rotate about a fixed axis while being positioned as shown relative to a blade blank or block of cutting material as shown in FIG. 10 secured by a clamp 40 to a support 41 rotatable about an axis 42 corresponding to the center axis 25 above described of one cutting face and extending transversely of one side of the rough wafer at the center of such side. The support 41 is swung back and forth to generate the conical surface 31 of revolution and correspondingly contour the edge portion of the supported wafer. As the wheel is advanced toward the wafer, successive cuts are taken until enough metal 43 (FIG. 11) has been removed to intersect the ends 50 with the adjacent sides 51 of the wafer at the corners of the wafer, that is, the lines 52 of intersection of the adjacent edge surfaces 51 of the blade blank.

After thus finishing contouring the first cutting face, the clamp is released and the blank is indexed to the support 41, a quarter revolution in this instance. In this position, it will be apparent that the axis 25 and the grinding wheel are disposed in the same relation as before with respect to the plane of the blade blank but in proper relation to the second side of the blank. The second margin of the blank is ground off in the same back and forth rocking of the fixture and downward feeding of the wheel to the same depth.

With the several faces 21 thus formed, it will be apparent that the axes 25 of curvature of the surfaces 31, 31ª of revolution on which the faces lie are all disposed at the same angle relative to the plane of the wafer, extend transversely of the respective cutting edges 20 at the longitudinal centers thereof and intersect each other and the center axis 30 of the wafer at a common point 39 (FIGS. 8 and 9).

The thickness of each blade blank 15 is such that the cutting faces 21 formed as above described will be of the desired axial width and intersect the front face 45 outwardly beyond the center 30. This leaves a central flat surface which is generally squared and is defined by arcuate border lines 44 at the intersection of the surfaces 21 and 44. The flat center area facilitates fastening the blade securely in the body 13 by the use of flat faced clamping elements.

After formation of the cutting faces 21 in the manner above described, each edge portion of the wafer below the cutting face is ground off to form the clearance faces 22, which are located relative to each other and the lines 35 of intersection of the cutting faces 21 that all of the adjacent cutting and clearance faces 21, 22 intersect substantially at a single point 36. These are flat faces disposed in planes which intersect the cutting faces 21 to impart the desired elliptical curvature above described to the resulting cutting edge 20.

If the wafer is not positioned precisely and in the same position relative to the wheel 38 during the grinding of each successive cutting face 21, the lines 35 of intersection will be disposed slightly to one side or the other of the true corner 36 and small notches (not shown) may be left in one of the cutting edges adjacent the corner. In such a case, the corners 36 are preferably ground off slightly to leave a small facet 46 and round off the ends of the cutting edges to slightly increase the depth of the cut that can be taken.

The cutting faces 21 accurately and properly positioned may be formed in the same manner above described as areas of other surfaces of revolution such, for example, as cylinders. This may be accomplished as illustrated in FIG. 14 in the same kind of fixture simply by changing the inclination of the blade blank 15 in the rotary support 41 and relative to the periphery 38 of the grinding wheel 37. Thus, the wheel axis and the periphery of the wheel 37 are disposed parallel to the axis 42 of the support while the blade blank 15 is disposed at an angle 55 relative to the axis 42. With this set-up, the same procedure as that first described is followed in forming the cutting faces 21 which will constitute cylindrical surfaces of revolution rather than the areas of conical surfaces of substantially equal radii of curvature. A surface similar to the conical surface 31 (FIG. 9) of revolution is thus described so that the two faces 21 intersect each other along the line or ridge 35 which extends diagonally of the blank to a point 36 which is substantially at the corner of the latter.

The same procedure is repeated to form the other two cutting faces 21 by grinding off similar layers of metal along the other two sides of the polygon after successive indexings of the wafer to extend the axis 25 transversely of the third and fourth sides of the wafer at the longitudinal centers thereof.

I claim as my invention:

1. An indexable cutter blade comprising a substantially flat wafer in the form of a polygon having a substantially flat back and a front face terminating around its periphery in a plurality of equal angularly spaced peripheral cutting edges of equal lengths composed of cutting material and defining an equilateral polygon disposed between and spaced from the planes of said back and front faces, clearance faces along the sides of the polygon, and cutting faces along the adjacent margins of said front face intersecting the clearance faces to define said cutting edges, said clearance faces being flat, straight, of equal lengths and equidistantly spaced from the center of the polygon, and said cutting faces being of identical size, shape and convex contour and constituting corresponding areas of surfaces of revolution having radii substantially longer than the lengths of said cutting edges and axes equally spaced angularly around the polygon and extending transversely of the respective cutting edges substantially at the centers thereof, said axes being inclined at equal angles relative to the plane of said wafer so that the adjacent cutting faces intersect along lines extending diagonally to the corners of the polygon whereby the adjacent cutting and clearance faces intersect substantially at a single point.

2. An indexable cutter blade as defined in claim 1 in which said axes of said surfaces of revolution substantially intersect each other and the central axis of said wafer at a common point.

3. A cutter blade as defined in claim 1 in which the central area of said front face within said cutting faces is substantially flat and parallel to the back of said wafer and intersect said convex cutting faces along shallow outwardly bulging arcuate lines.

4. A cutter blade as defined in claim 1 in which the adjacent ones of said cutting faces intersect along a diagonal line intersecting the axis of said wafer and a corner of said polygon.

5. An indexable cutter blade as defined in claim 1 in which said surfaces of revolution defining said cutting faces are cylinders.

6. An indexable cutter blade as defined in claim 1 in which said surfaces of revolution defining said cutting faces are conical.

No references cited.

WILLIAM W. DYER, Jr., *Primary Examiner.*

HARRISON L. HINSON, *Examiner.*